US012613944B2

(12) United States Patent
Sanctis et al.

(10) Patent No.: US 12,613,944 B2
(45) Date of Patent: Apr. 28, 2026

(54) PORTAL APPLICATION AS AUTHENTICATOR

(71) Applicant: Bank of America Corporation, Charlotte, NC (US)

(72) Inventors: Jennifer Sanctis, Charlotte, NC (US); Jesse James Godley, Charlotte, NC (US); Trish Gillis, Chicago, IL (US); Taylor Farris, Hoboken, NJ (US)

(73) Assignee: Bank of America Corporation, Charlotte, NC (US)

( * ) Notice: Subject to any disclaimer, the term of this patent is extended or adjusted under 35 U.S.C. 154(b) by 211 days.

(21) Appl. No.: 18/216,004

(22) Filed: Jun. 29, 2023

(65) Prior Publication Data

US 2025/0005117 A1     Jan. 2, 2025

(51) Int. Cl.
*G06F 21/00*     (2013.01)
*G06F 21/31*     (2013.01)
*G06F 21/53*     (2013.01)

(52) U.S. Cl.
CPC ............. *G06F 21/31* (2013.01); *G06F 21/53* (2013.01)

(58) Field of Classification Search
None
See application file for complete search history.

(56) References Cited

U.S. PATENT DOCUMENTS 9,473,485 B2 * 10/2016 Kendall .................. G06F 21/53
10,567,302 B2 * 2/2020 Petys .................... H04W 12/35

2012/0197728 A1 * 8/2012 Luna ...................... G06Q 30/02
                                                              715/764
2012/0210253 A1 * 8/2012 Luna ....................... H04L 51/04
                                                              715/753
2015/0332262 A1 * 11/2015 Lingappa ........... G06Q 20/3823
                                                              705/71
2016/0036801 A1 * 2/2016 Caldwell ............. G06Q 20/322
                                                              726/6
2017/0235453 A1 * 8/2017 Selfridge .............. H04W 4/021
                                                              715/741
2017/0372122 A1 * 12/2017 Shim ................... H04W 12/065
2020/0348823 A1 * 11/2020 Cheng ................. H04M 1/0264
2022/0100326 A1 * 3/2022 Sukhyani ............ G06F 3/04842
2022/0197999 A1 * 6/2022 Mo ....................... G06F 21/604
2023/0367634 A1 * 11/2023 Zhao ................... G06F 11/3013

* cited by examiner

*Primary Examiner* — Shin-Hon (Eric) Chen
(74) *Attorney, Agent, or Firm* — Weiss & Arons LLP

(57)     ABSTRACT

Systems and methods for authentication may be provided. Systems may include a shell application. The shell application may operate on a mobile device. The shell application may use an authentication protocol to authenticate a user. The shell application may display, to the authenticated user, a plurality of mobile application icons. The shell application may receive a user indication of a desired mobile application. The shell application may port the user from the shell application into the selected mobile application. The shell application may launch and stream the selected mobile application from a cloud location into the shell application. The shell application may enable the user to directly interact with the selected mobile application without the need for further authentication or downloading.

10 Claims, 8 Drawing Sheets

Shell application stores
user preferences, including
authentication information

Shell application downloaded
onto mobile device

IN-USE PROCESS

202

Shell application authenticates user

204

Shell application receives request from user for an app

206

Shell application communicates with a cloud location that hosts apps

208

Shell application ports user into the user-selected app using the authenticated credentials

210

User interacts with app through shell application

IN-USE PROCESS (2)

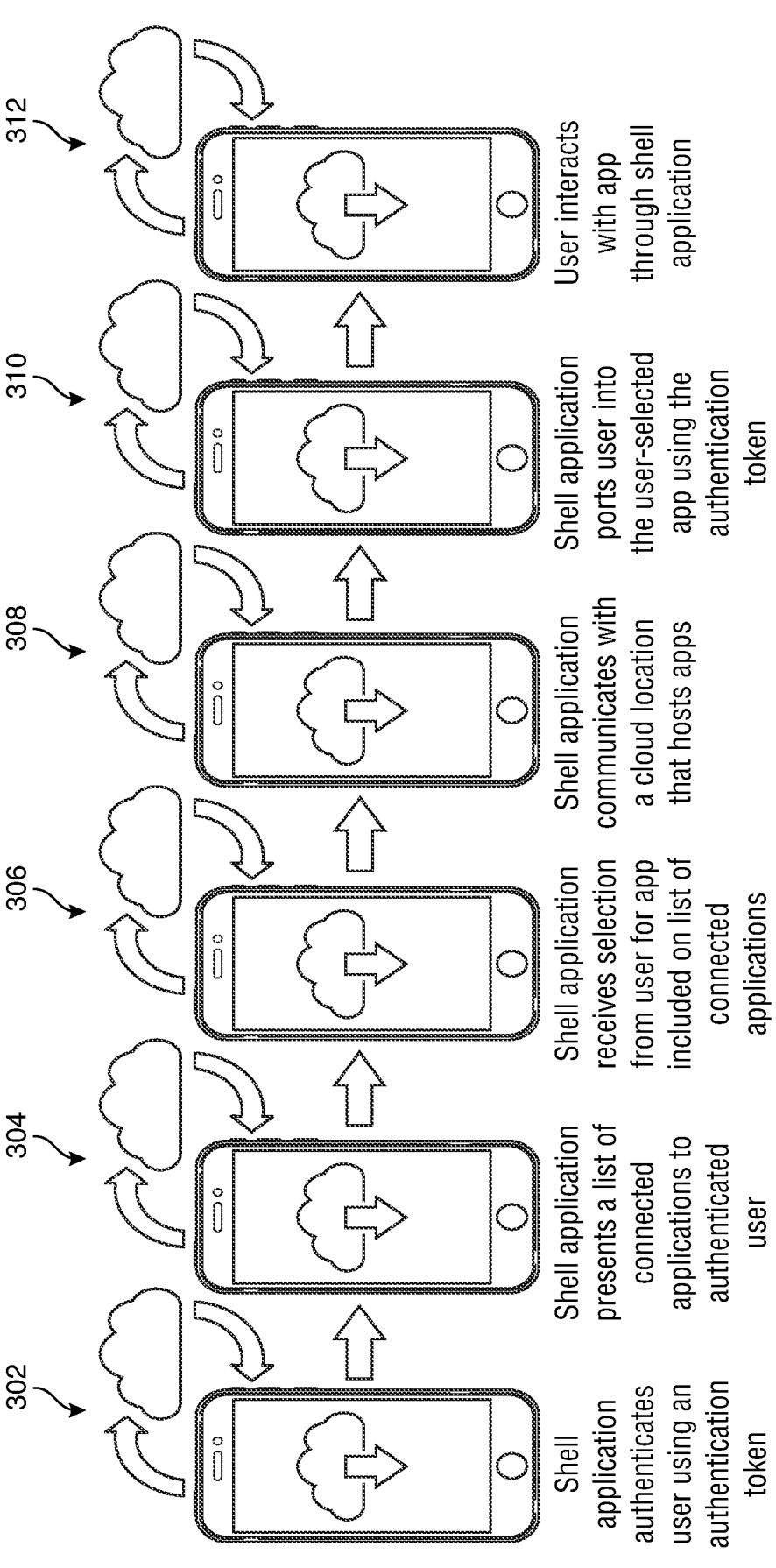

302  Shell application authenticates user using an authentication token

304  Shell application presents a list of connected applications to authenticated user 306  Shell application receives selection from user for app included on list of connected applications 308  Shell application communicates with a cloud location that hosts apps 310  Shell application ports user into the user-selected app using the authentication token 312  User interacts with app through shell application

FIG. 3

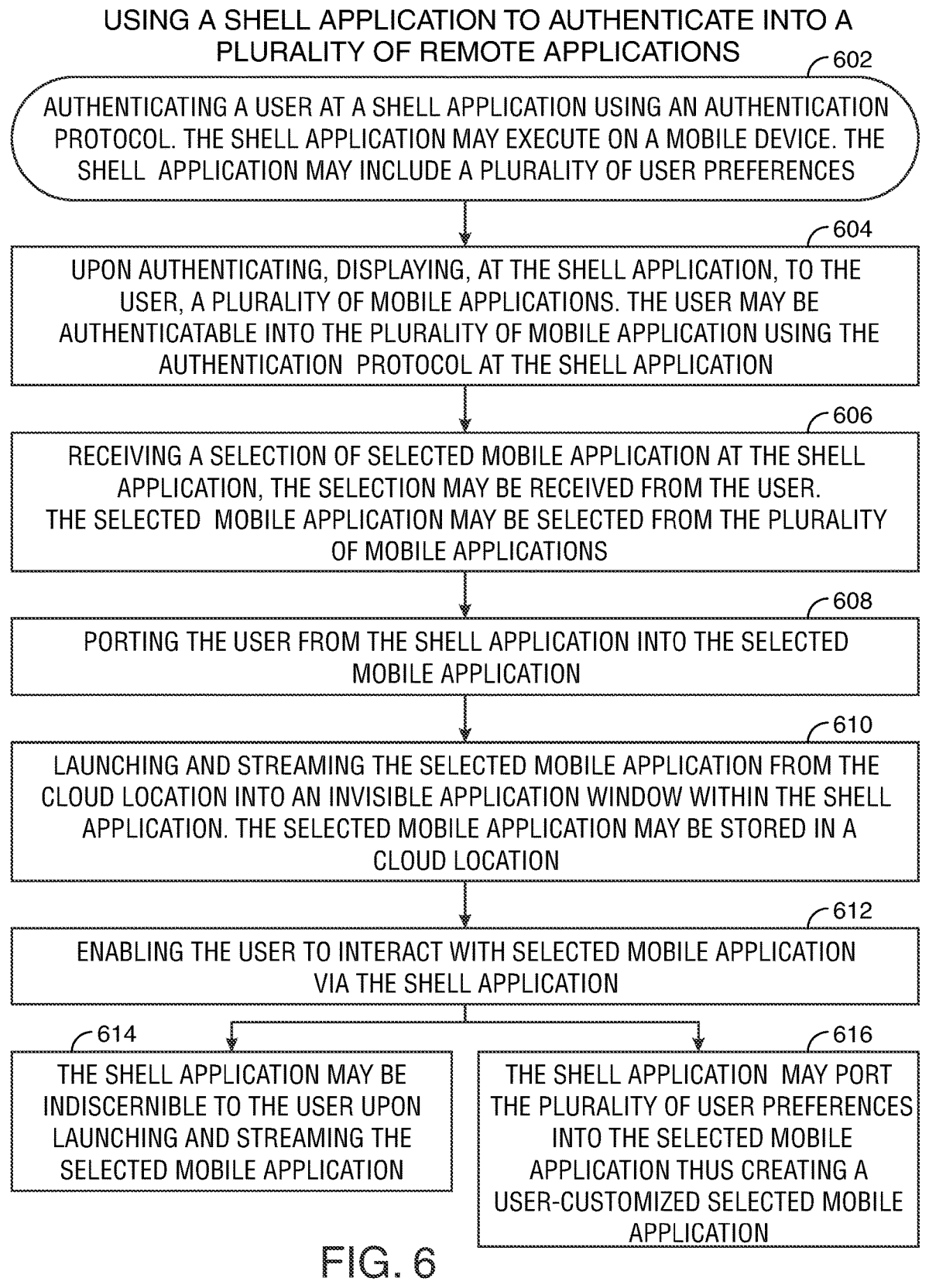

USING A SHELL APPLICATION TO AUTHENTICATE INTO A
PLURALITY OF REMOTE APPLICATIONS ⌐602

AUTHENTICATING A USER AT A SHELL APPLICATION USING AN AUTHENTICATION
PROTOCOL. THE SHELL APPLICATION MAY EXECUTE ON A MOBILE DEVICE. THE
SHELL APPLICATION MAY INCLUDE A PLURALITY OF USER PREFERENCES

⌐604

UPON AUTHENTICATING, DISPLAYING, AT THE SHELL APPLICATION, TO THE
USER, A PLURALITY OF MOBILE APPLICATIONS. THE USER MAY BE
AUTHENTICATABLE INTO THE PLURALITY OF MOBILE APPLICATION USING THE
AUTHENTICATION PROTOCOL AT THE SHELL APPLICATION

⌐606

RECEIVING A SELECTION OF SELECTED MOBILE APPLICATION AT THE SHELL
APPLICATION, THE SELECTION MAY BE RECEIVED FROM THE USER.
THE SELECTED MOBILE APPLICATION MAY BE SELECTED FROM THE PLURALITY
OF MOBILE APPLICATIONS

⌐608

PORTING THE USER FROM THE SHELL APPLICATION INTO THE SELECTED
MOBILE APPLICATION

⌐610

LAUNCHING AND STREAMING THE SELECTED MOBILE APPLICATION FROM THE
CLOUD LOCATION INTO AN INVISIBLE APPLICATION WINDOW WITHIN THE SHELL
APPLICATION. THE SELECTED MOBILE APPLICATION MAY BE STORED IN A
CLOUD LOCATION

⌐612

ENABLING THE USER TO INTERACT WITH SELECTED MOBILE APPLICATION
VIA THE SHELL APPLICATION

⌐614

THE SHELL APPLICATION MAY BE
INDISCERNIBLE TO THE USER UPON
LAUNCHING AND STREAMING THE
SELECTED MOBILE APPLICATION

⌐616

THE SHELL APPLICATION MAY PORT
THE PLURALITY OF USER PREFERENCES
INTO THE SELECTED MOBILE
APPLICATION THUS CREATING A
USER-CUSTOMIZED SELECTED MOBILE
APPLICATION

FIG. 6

PORTAL APPLICATION AS AUTHENTICATOR

FIELD OF TECHNOLOGY

Aspects of the disclosure relate to mobile device applications. Specifically, aspects of the disclosure relate to authentication of mobile device applications.

BACKGROUND OF THE DISCLOSURE

Recently, there has been an increase in the number of mobile applications in use. Furthermore, there has been increasing usage frequency of mobile device applications. Because of the increase in the number of mobile applications as well as the increase in the usage frequency of the mobile device applications, there may be an increase in security consequences.

Specifically, a publisher may publish a plurality of different applications, which may be downloadable onto a mobile device. It should be that noted, at present, the communication between any two different applications may be limited and primitive. Specifically, present platforms allow for including a link to a second application within a first application. The link, when selected, directs the mobile device to instantiate an instance of the second application, in the event that the mobile device has the second application already installed. However, if the mobile device does not have the second application already installed, the link may direct the user to a webpage, which, in turn, directs the user to download and install the second application.

As such, communication between applications, even from the same application publisher, is not available. It should be noted that because of the proliferation of applications as well as the limited capabilities of inter-application communication, there may be an increase in security consequences. Security consequences may result because authenticating into multiple applications may be time consuming and may increase the re-use of passwords and other such authentication information.

Therefore, it would be desirable to create a shell application. It would be further desirable for the shell application to store user preferences, such as authentication data. It would be yet further desirable for the shell application to enable a mobile device to access a plurality of applications without providing additional authentication data. It would be yet further desirable for the applications to be able to communicate with one another.

SUMMARY OF THE DISCLOSURE

Apparatus, methods and systems for using a shell application to authenticate into a plurality of remote applications is provided. Methods may include authenticating a user at a shell application. The shell application may be a placeholder application that is stored on, and operates on, a mobile device. The shell application may have communication capabilities, which may enable the shell application to communicate with one or more remote locations. The shell application may be operable to store a limited amount of data. The limited amount of data may include a plurality of user preferences. The limited amount of data may include connectivity data. The limited amount of data may enable the shell application to authenticate with one or more remote applications.

Authenticating the user at the shell application may involve an authentication protocol. The authentication protocol may include an authentication token, a username and password entry or any other suitable authentication protocol. The authenticating may include communicating, by the shell application, with an authentication database. The authentication database may be remote from the mobile device. The communication between the shell application and the mobile device may authenticate the user.

Upon authentication, the shell application may display a plurality of mobile applications. The displayed mobile applications may be applications for use with a mobile device ("mobile applications") in which the user may be able to authenticate based on the authentication protocol at the shell application. The plurality of mobile applications may be pre-identified by the user. The plurality of mobile applications may display an unlocked symbol on each mobile application included in the plurality of mobile applications.

At times, the plurality of mobile applications may be a second plurality of mobile applications selected from a first plurality of mobile applications. The second plurality of mobile applications may be identified and listed based on a selection of a subset of mobile applications included in the first plurality of mobile applications. The first plurality of mobile applications may be authenticatable based on the authentication protocol. The selection of the second plurality of mobile applications may be based on user selection, historical user usage or any other suitable selection. The first plurality of mobile applications may be displayed as locked and/or as mobile-device stored applications. The second plurality of mobile applications may be displayed as unlocked and/or as cloud applications. The first plurality of mobile applications may utilize a download to execute.

The shell application may receive a selection of a mobile application from the plurality of mobile applications. The selection may be received from the user.

Once the selection is received and the shell application has authenticated the user into the selected application, the shell application may port into the selected application. As such, the user may be ported into the selected mobile application and the user may directly interact with the shell application.

The selected mobile application may be launched and streamed from a cloud location, in which the selected mobile application is stored, to an invisible application window within the shell application. The user may be able to interact with the selected mobile application via the shell application. The shell application may be indiscernible to the user upon launching and streaming the selected mobile application. The shell application may port the plurality of user preferences into the selected mobile application thus creating a user-customized selected mobile application.

BRIEF DESCRIPTION OF THE DRAWINGS

The objects and advantages of the invention will be apparent upon consideration of the following detailed description, taken in conjunction with the accompanying drawings, in which like reference characters refer to like parts throughout, and in which:

FIG. 3 shows still another illustrative diagram in accordance with principles of the disclosure;

FIG. 6 shows an illustrative flow chart in accordance with principles of the disclosure;

DETAILED DESCRIPTION OF THE DISCLOSURE

Apparatus, methods and systems for an authentication system is provided. The authentication system may include a shell application. The shell application may operate on a processor of a mobile device. The shell application may store a plurality of user preferences. The shell application may use an authentication protocol to authenticate a user. The shell application may display a plurality of mobile applications to the user upon authentication of the user.

The shell application may receive a selection of a selected mobile application from the plurality of mobile applications. The selection may be received from the user.

The shell application may port the user from the shell application into the selected mobile application. The shell application may launch and stream the selected mobile application from the cloud location into an invisible application window within the shell application. The selected mobile application may be stored in a cloud location. The shell application may enable the user to interact with the selected mobile application via the shell application.

The shell application may be indiscernible to the user upon the launch and stream of the selected mobile application. The shell application may port the plurality of user preferences into the selected mobile application.

Apparatus and methods described herein are illustrative. Apparatus and methods in accordance with this disclosure will now be described in connection with the figures, which form a part hereof. The figures show illustrative features of apparatus and method steps in accordance with the principles of this disclosure. It is to be understood that other embodiments may be utilized and that structural, functional and procedural modifications may be made without departing from the scope and spirit of the present disclosure.

The steps of methods may be performed in an order other than the order shown or described herein. Embodiments may omit steps shown or described in connection with illustrative methods. Embodiments may include steps that are neither shown nor described in connection with illustrative methods.

Illustrative method steps may be combined. For example, an illustrative method may include steps shown in connection with another illustrative method.

Apparatus may omit features shown or described in connection with illustrative apparatus. Embodiments may include features that are neither shown nor described in connection with the illustrative apparatus. Features of illustrative apparatus may be combined. For example, an illustrative embodiment may include features shown in connection with another illustrative embodiment.

Figure 1:
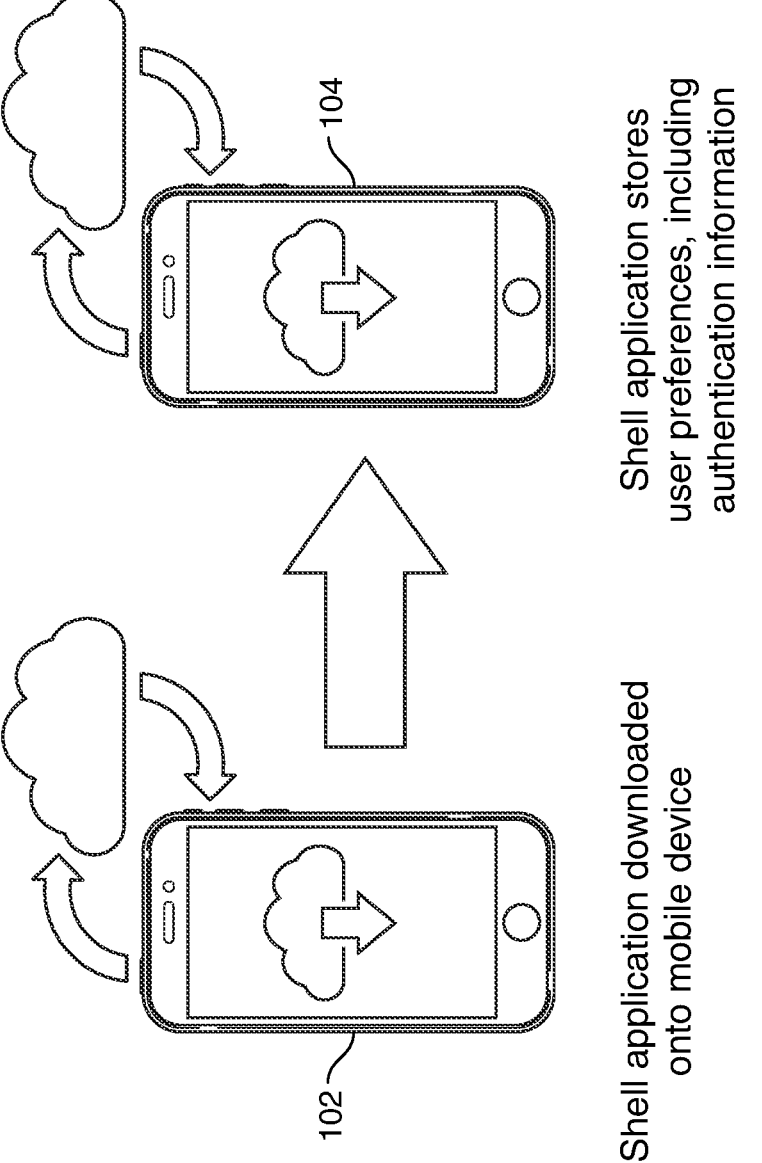
FIG. 1 shows an illustrative diagram in accordance with principles of the disclosure.

FIG. 1 shows an illustrative diagram. The illustrative diagram shows a registration process. The registration process may enable a user to register and store a shell application on a mobile device. The registration process may also enable a user to utilize the shell application.

Mobile device 102 shows a shell application downloaded onto a mobile device. The shell application may be available at any location suitable for retrieving and/or downloading mobile applications. Such locations may include network locations. Such network may include internet locations and/or intranet locations. Such locations may be private locations. Such locations may be public locations. Private locations may be identified as entity-specific locations that are accessible to individuals included in, or associated with, the entity. Private locations may not be available to individuals not included in, or not associated with, the entity. Public locations may be identified as locations that are accessible to the general population.

Once the shell application is downloaded onto a mobile device, an activation process may be initiated on the mobile device. The activation process may include retrieving and/or receiving data from the mobile device. Data retrieval and/or receival may include requesting, from the user, data relating to user preferences and/or authentication. Such user preference data may include a username, a password, biometric data, personal identification number ("PIN") data, authentication token data and any other user preference data. The user preference data may be used to authenticate the user into one or more applications.

Figure 2:
FIG. 2 shows another illustrative diagram in accordance with principles of the disclosure.

FIG. 2 shows an illustrative diagram. The illustrative diagram shows an in-use process. The in-use process shows the shell application authenticates the user, as shown at step 202. At step 204, the shell application may receive a request from a user for an application.

At step 206, the shell application may communicate with a cloud location that hosts applications. A cloud location may include an app store, a cloud database that stores applications and any other suitable cloud locations.

At step 208, the shell application may port the user into the user-selected application using the authenticated credentials. The authenticated credentials may be stored within the user preferences at the shell application. The authenticated credentials may be shared across multiple applications. The authenticated credentials may be different authenticated credentials for different applications. At times, the authenticated credentials may be the same across applications that share an author and/or publisher.

At step 210, the user may interact with the application through the shell application. At times, during the interaction between the user and the application, the shell application may operate in the background and may be indiscernible, or silent to the user.

FIG. 3 shows another illustrative application. The illustrative application shows another in-use process. Step 302 shows the shell application authenticates the user using an authentication token. Step 304 shows the shell application presents a list of connected applications to an authenticated user. Step 306 shows the shell application receives selection from the user for an app included on the list of connected applications. Step 308 shows the shell application communicates with a cloud location that hosts applications. Step 310 shows the shell application ports the user into the user-selected application using the authentication token. Step 312 shows the user interacts with the application through the shell application. The shell application may operate in the background and may be indiscernible to the user when the user is interacting with the application.

Figure 4:
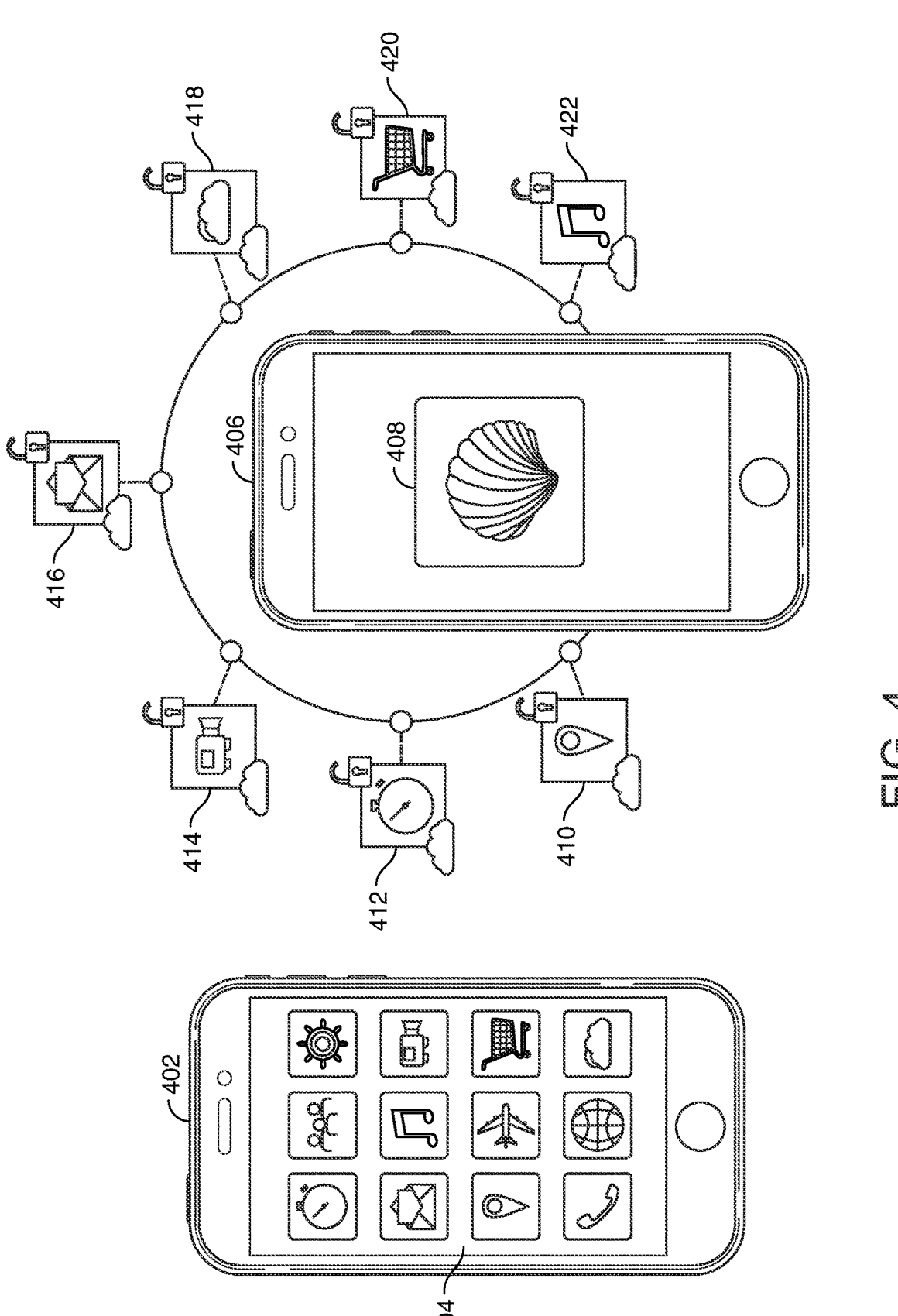
FIG. 4 shows yet another illustrative diagram in accordance with principles of the disclosure.

FIG. 4 shows an illustrative diagram. The illustrative diagram shows mobile device 402 and mobile device 406. Mobile device 402 may display multiple available applications, as shown on screen 404. The multiple applications may have been downloaded by a user onto mobile device 402. It should be noted that downloaded applications may be limited in size. Therefore, a downloaded application may be limited to a predetermined size. The predetermined size may be 15 MB-200 MB. The predetermined size may be 2 GB. The predetermined size may be any suitable size. It should also be noted that browser-based or cloud-based applications may not be limited in size because the executable is not stored on the application itself. Rather, the application executable is streamed from the browser or cloud location to the mobile device.

Application streaming may be a form of on-demand software distribution. In such application streaming, essential portions of an application may be installed on the mobile device. While the end user performs actions within the application, other code and files may be delivered to the mobile device as used by the application. Applicant streaming may be beneficial in that many functions of an application are never or seldom used. Therefore, these functions may not waste storage space on the mobile device. Additionally, streamed applications may not use storage space after the application has been closed at the mobile device. As such, each instance of accessing a mobile application may initiate a new stream of data between the cloud location and the mobile device.

Additionally, pulling the application on-demand may be more efficient in terms of server, client and network usage. Streaming may also enable applications to be cached on the mobile device and operate in a traditional manner. Updates may be deployed automatically to the cached application files.

Mobile device 406 may include a shell application, shown at 408. The shell application may communication with various cloud-based applications, including location application 410, international clock application 412, video application 414, email application 416, weather application 418, grocery application 420 and music application 422. Each of the applications may be stored on a cloud location and streamed to mobile device 416 upon request from an end user of mobile device 406. Each of the applications may be shown as both unlocked and cloud-based. The unlocked icon may indicate that, for the mobile application, authentication information, such as an authentication token included in the shell application, may be sufficient authentication information to enable the shell application to access the mobile application without further authentication. The cloud icon may indicate that the mobile application is located at a cloud location.

Figure 5:
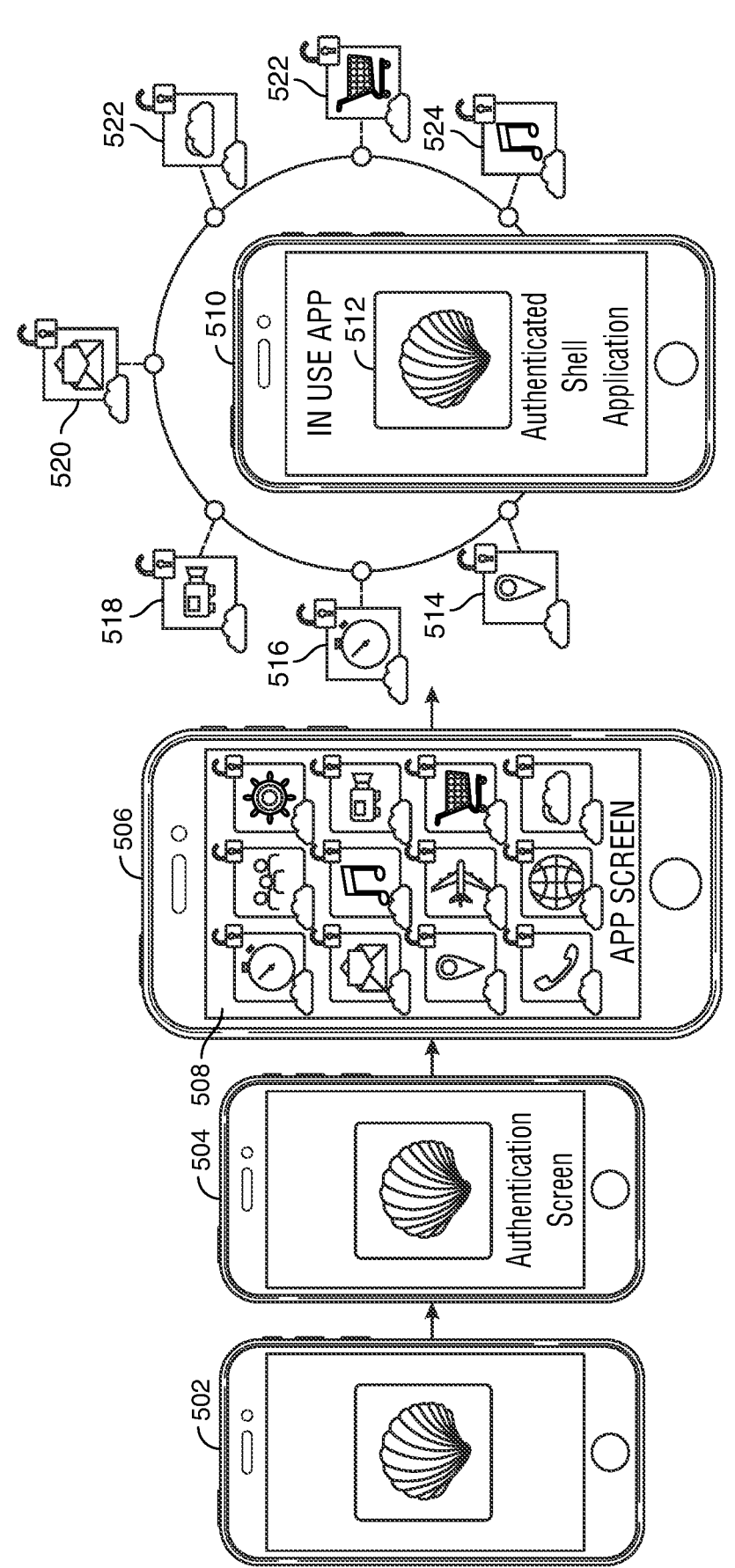
FIG. 5 shows still yet another illustrative diagram in accordance with principles of the disclosure.

FIG. 5 shows an illustrative diagram. The illustrative diagram shows a process or using a shell application to access a mobile application. Mobile device 502 shows a shell application executing on a mobile device. Mobile device 504 shows an authentication screen. A user may authenticate into the shell application by providing credentials, such as an authentication token, username and password and any other suitable credentials.

Once a user has authenticated into the shell application, the shell application may display a plurality of available mobile applications, as displayed on app screen 508. Screen 508 may be displayed on mobile device 506.

Upon selection of a mobile application, the user may be ported into the selected mobile application. The user may also be able interact directly with the mobile application. Mobile device 510 includes authenticated shell application 512. During an in-use process, authenticated shell application may enable the user to interact directly with location application 514, international clock application 516, video application 518, email application 520, weather application 522, grocery application 522 and music application 524.

FIG. 6 shows an illustrative flow chart. The illustrative flow chart shows using a shell application to authenticate into a plurality of remote applications. Step 602 shows authenticating a user, at a shell application, using an authentication protocol. The shell application may execute on a mobile device. The shell application may include a plurality of user preferences.

Step 604 shows upon authenticating, displaying, at the shell application, to the user, a plurality of mobile applications. The plurality of mobile applications may be remote applications. The user may be authenticatable into the plurality of mobile applications using the authentication protocol at the shell application.

Step 606 shows receiving a selection of a selected mobile application at the shell application. The selection may be received from the user. The selected mobile application may be selected from the plurality of mobile applications.

Step 608 shows porting the user form the shell application into the selected mobile application.

Step 610 shows launching and streaming the selected mobile application from the cloud location into an invisible application window within the application. The selected mobile application may be stored in a cloud location.

Step 612 shows enabling the user to interact with the selected mobile application via the shell application.

Sub-step 614 shows the shell application may be indiscernible to the user upon launching and streaming the selected mobile application. Sub-step 616 shows the shell application may port the plurality of user preferences into the selected mobile application. The user preferences may include authentication information, display preferences, user data and any other suitable preferences. Examples of display preferences may include screen size, font size, screen resolution, screen coloring and any other suitable display preferences. Examples of user data may include a name, mobile device identifier, mobile device phone number, address and any other suitable user data. As such, a user-customized selected mobile application may be created.

Figure 7:
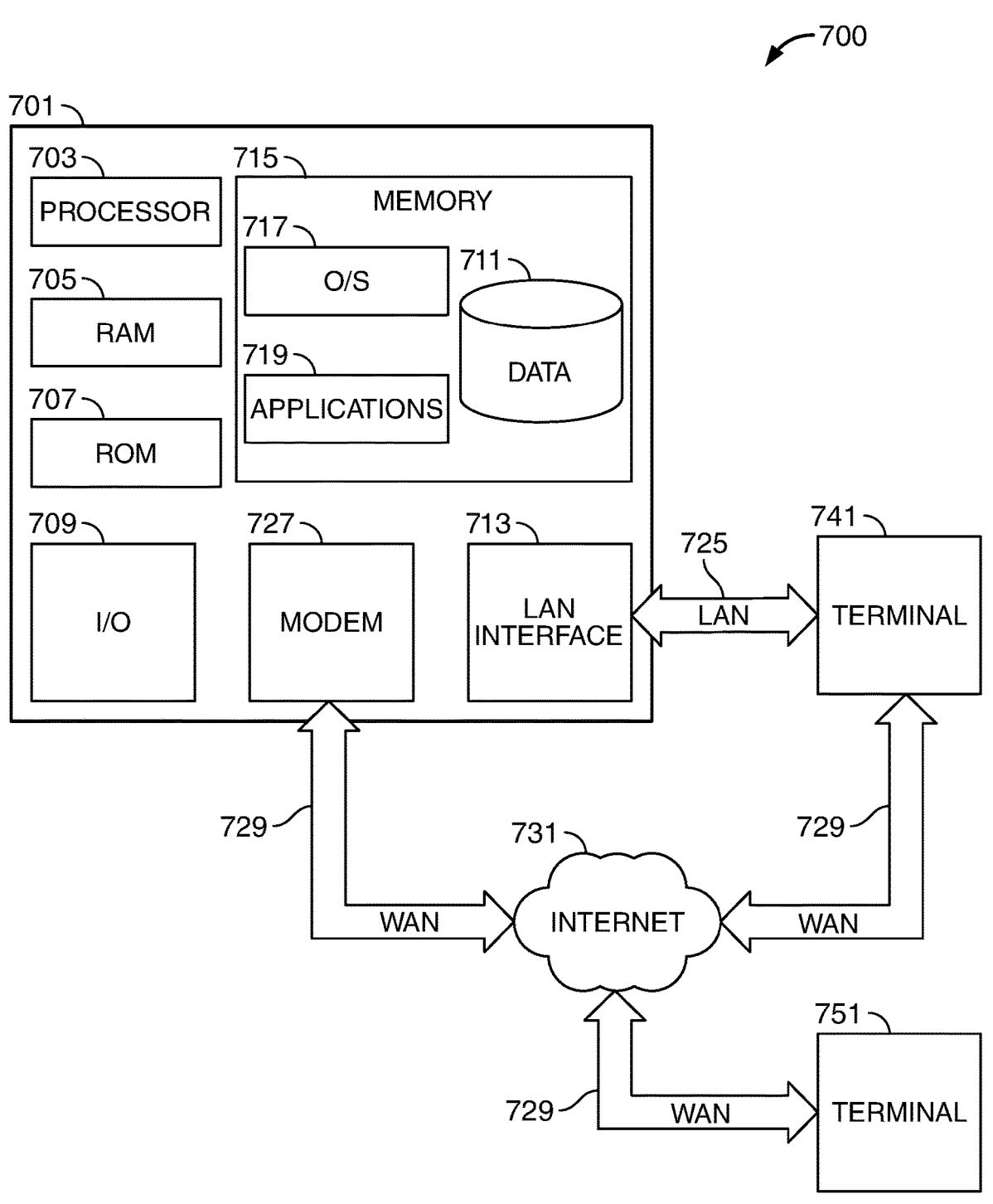
FIG. 7 shows another illustrative diagram in accordance with principles of the disclosure.

FIG. 7 shows an illustrative block diagram of system 700 that includes computer 701. Computer 701 may alternatively be referred to herein as a "server" or a "computing device." Computer 701 may be a workstation, desktop, laptop, tablet, smart phone, or any other suitable computing device. Elements of system 700, including computer 701, may be used to implement various aspects of the systems and methods disclosed herein.

Computer 701 may have a processor 703 for controlling the operation of the device and its associated components, and may include RAM 705, ROM 707, input/output module 709, and a memory 715. The processor 703 may also execute all software running on the computer—e.g., the operating system and/or voice recognition software. Other components commonly used for computers, such as EEPROM or Flash memory or any other suitable components, may also be part of the computer 701.

The memory 715 may comprise any suitable permanent storage technology—e.g., a hard drive. The memory 715 may store software including the operating system 717 and application(s) 719 along with any data 711 needed for the operation of the system 700. Memory 715 may also store videos, text, and/or audio assistance files. The videos, text, and/or audio assistance files may also be stored in cache memory, or any other suitable memory. Alternatively, some or all of computer executable instructions (alternatively referred to as "code") may be embodied in hardware or firmware (not shown). The computer 701 may execute the instructions embodied by the software to perform various functions.

Input/output ("I/O") module may include connectivity to a microphone, keyboard, touch screen, mouse, and/or stylus through which a user of computer 701 may provide input. The input may include input relating to cursor movement. The input may relate to transaction pattern tracking and prediction. The input/output module may also include one or more speakers for providing audio output and a video display device for providing textual, audio, audiovisual, and/or graphical output. The input and output may be related to computer application functionality. The input and output may be related to transaction pattern tracking and prediction.

System 700 may be connected to other systems via a local area network (LAN) interface 713.

System 700 may operate in a networked environment supporting connections to one or more remote computers, such as terminals 741 and 751. Terminals 741 and 751 may be personal computers or servers that include many or all of the elements described above relative to system 700. The network connections depicted in FIG. 7 include a local area network (LAN) 725 and a wide area network (WAN) 729, but may also include other networks. When used in a LAN networking environment, computer 701 is connected to LAN 725 through a LAN interface or adapter 713. When used in a WAN networking environment, computer 701 may include a modem 727 or other means for establishing communications over WAN 729, such as Internet 731.

It will be appreciated that the network connections shown are illustrative and other means of establishing a communications link between computers may be used. The existence of various well-known protocols such as TCP/IP, Ethernet, FTP, HTTP and the like is presumed, and the system can be operated in a client-server configuration to permit a user to retrieve web pages from a web-based server. The web-based server may transmit data to any other suitable computer system. The web-based server may also send computer-readable instructions, together with the data, to any suitable computer system. The computer-readable instructions may be to store the data in cache memory, the hard drive, secondary memory, or any other suitable memory.

Additionally, application program(s) 719, which may be used by computer 701, may include computer executable instructions for invoking user functionality related to communication, such as e-mail, Short Message Service (SMS), and voice input and speech recognition applications. Application program(s) 719 (which may be alternatively referred to herein as "plugins," "applications," or "apps") may include computer executable instructions for invoking user functionality related to performing various tasks. The various tasks may be related to transaction pattern tracking and prediction.

Computer 701 and/or terminals 741 and 751 may also be devices including various other components, such as a battery, speaker, and/or antennas (not shown).

Terminal 751 and/or terminal 741 may be portable devices such as a laptop, cell phone, Blackberry™, tablet, smartphone, or any other suitable device for receiving, storing, transmitting and/or displaying relevant information. Terminals 751 and/or terminal 741 may be other devices. These devices may be identical to system 700 or different. The differences may be related to hardware components and/or software components.

Any information described above in connection with database 711, and any other suitable information, may be stored in memory 715. One or more of applications 719 may include one or more algorithms that may be used to implement features of the disclosure, and/or any other suitable tasks.

The invention may be operational with numerous other general purpose or special purpose computing system environments or configurations. Examples of well-known computing systems, environments, and/or configurations that may be suitable for use with the invention include, but are not limited to, personal computers, server computers, hand-held or laptop devices, tablets, mobile phones, smart phones and/or other personal digital assistants ("PDAs"), multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc., that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

Figure 8:
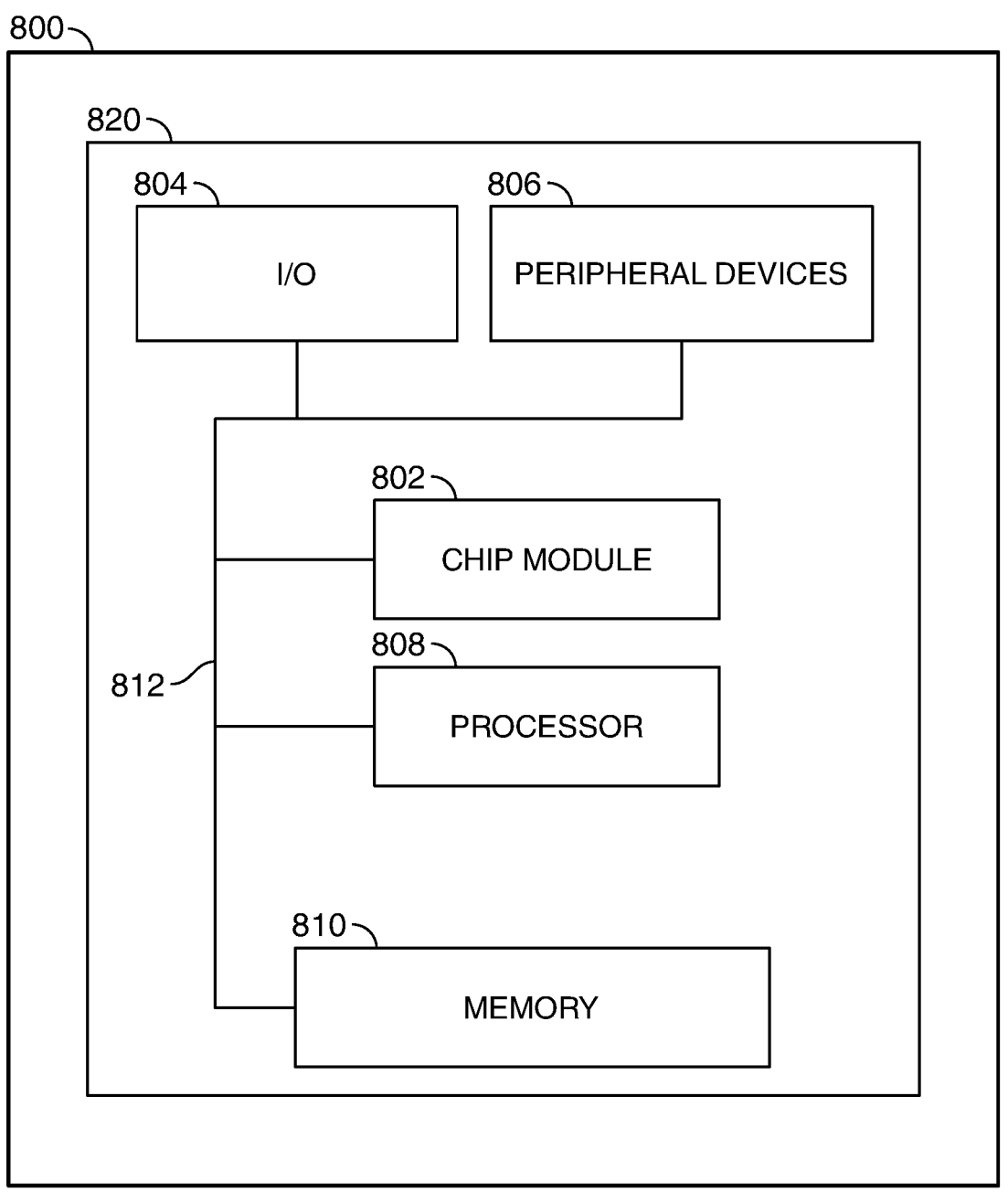
FIG. 8 shows yet another illustrative diagram in accordance with principles of the disclosure.

FIG. 8 shows illustrative apparatus 800 that may be configured in accordance with the principles of the disclosure. Apparatus 800 may be a computing machine. Apparatus 800 may include one or more features of the apparatus shown in FIG. 7. Apparatus 800 may include chip module 802, which may include one or more integrated circuits, and which may include logic configured to perform any other suitable logical operations.

Apparatus 800 may include one or more of the following components: I/O circuitry 804, which may include a transmitter device and a receiver device and may interface with fiber optic cable, coaxial cable, telephone lines, wireless devices, PHY layer hardware, a keypad/display control device or any other suitable media or devices; peripheral devices 806, which may include counter timers, real-time timers, power-on reset generators or any other suitable peripheral devices; logical processing device 808, which may compute data structural information and structural parameters of the data; and machine-readable memory 810.

Machine-readable memory 810 may be configured to store in machine-readable data structures: machine executable instructions (which may be alternatively referred to herein as "computer instructions" or "computer code"), applications, signals, and/or any other suitable information or data structures.

Components 802, 804, 806, 808 and 810 may be coupled together by a system bus or other interconnections 812 and may be present on one or more circuit boards such as 820. In some embodiments, the components may be integrated into a single chip. The chip may be silicon-based.

Thus, systems and methods for a portal application as authenticator are provided. Persons skilled in the art will appreciate that the present invention can be practiced by other than the described embodiments, which are presented for purposes of illustration rather than of limitation. The present invention is limited only by the claims that follow.

What is claimed is:

1. A method for using a shell application to authenticate into a plurality of remote applications, the method comprising:

authenticating a user at a shell application using an authentication protocol, said authentication protocol comprising an authentication token, said shell application executing on a mobile device, the shell application comprising a plurality of user preferences;

upon authenticating, displaying on a display, at the shell application, to the user, a plurality of mobile applications, the plurality of mobile applications comprising a first subset of the plurality of mobile applications and a second subset of the plurality of mobile applications, wherein:

each mobile application, included in the plurality of mobile applications, comprises a unique set of authentication credentials; and the user is, at least partially, authenticatable into the plurality of mobile applications using the authentication protocol at the shell application;

displaying, on the display, an unlocked symbol on each mobile application included in the first subset of the plurality of mobile applications, said unlocked symbol indicating that the authentication protocol comprises sufficient authentication data for enabling the shell application to access each mobile application included in the first subset of the plurality of mobile applications without additional authentication data;

displaying, on the display, a locked symbol on each mobile application included in the second subset of the plurality of mobile applications, said locked symbol indicating that the authentication protocol fails to include sufficient authentication data for enabling the shell application to access each mobile application included in the second plurality of mobile applications without additional authentication data;

receiving a selection of a mobile application at the shell application, the selection being received from the user, said selected mobile application being selected from the plurality of mobile applications, the selection being of a selected mobile application;

when the selected mobile application is included in the second subset of the plurality of mobile applications, requesting, from the user, the additional authentication data corresponding to the unique set of authentication credentials of the selected mobile application;

when the selected mobile application is included in the second subset of the plurality of mobile applications, upon receipt, from the user, of the additional authentication data corresponding to the unique set of authentication credentials of the selected mobile application, porting the user from the shell application into the selected mobile application;

when the selected mobile application is included in the first subset of the plurality of mobile applications, porting the user directly from the shell application into the selected mobile application;

launching and streaming, on the display, the selected mobile application, the selected mobile application being stored in a cloud location, from the cloud location into an invisible application window within the shell application; and enabling the user to interact with selected mobile application via the shell application, wherein:

the shell application is silent to the user upon launching and streaming the selected mobile application; and the shell application ports the plurality of user preferences into the selected mobile application thus creating a user-customized selected mobile application.

2. The method of claim 1 wherein the authenticating further comprises communicating, by the shell application, with an authentication database, said authentication database remote from the mobile device, to authenticate the user.

3. The method of claim 1 wherein the plurality of mobile applications is pre-identified by the user.

4. The method of claim 1 further comprising displaying the first plurality of mobile applications as mobile device-stored applications and the second plurality of mobile applications as cloud applications.

5. The method of claim 4 wherein the first plurality of mobile applications utilizes a download to execute.

6. An authentication system comprising:

a hardware processor operating within a mobile device, said hardware processor operable to execute:

a shell application:

stores a plurality of user preferences;

uses an authentication protocol to authenticate a user, said authentication protocol comprising an authentication token;

displays on a display, upon authentication of the user, to the user, a plurality of mobile applications, the plurality of mobile applications comprising a first subset of the plurality of mobile applications and a second subset of the plurality of mobile applications, wherein:

each mobile application, included in the plurality of mobile applications, comprises a unique set of authentication credentials;

the user is, at least partially, authenticatable into the plurality of mobile applications using the authentication protocol at the shell application;

displays on the display, an unlocked symbol on each mobile application included in the first subset of the plurality of mobile applications, said unlocked symbol indicating that the authentication protocol comprises sufficient authentication data for enabling the shell application to access each mobile application included in the first subset of the plurality of mobile applications without additional authentication data;

displays on the display, a locked symbol on each mobile application included in the second subset of the plurality of mobile applications, said locked symbol indicating that the authentication protocol fails to include sufficient authentication data for enabling the shell application to access each mobile application included in the second plurality of mobile applications without additional authentication data;

receives, from the user, a selection, of a selected mobile application, from the plurality of mobile applications;

when the selected mobile application is included in the second subset of the plurality of mobile applications, requesting, from the user, the additional authentication data corresponding to the unique set of authentication credentials of the selected mobile application;

upon receipt, from the user, of the additional authentication data corresponding to the unique set of authentication credentials of the selected mobile application, ports the user from the shell application into the selected mobile application;

when the selected mobile application is included in the
          first subset of the plurality of mobile applications,
          ports the user directly from the shell application into
          the selected mobile application;

launches and streams the selected mobile application,
          the selected mobile application stored in a cloud
          location, from the cloud location into an invisible
          application window within the shell application;

enables the user to interact with the selected mobile
          application via the shell application;

wherein:

the shell application is silent to the user upon the launch
        and stream of the selected mobile application; and the shell application ports the plurality of user preferences
        into the selected mobile application.

7. The authentication system of claim 6 wherein the authenticating the user comprises communication with an authentication database, the authentication database located at a location remote from the mobile device.

8. The authentication system of claim 6 wherein the plurality of mobile applications is pre-selected by the user.

9. The authentication system of claim 6 wherein the first plurality of mobile applications is displayed as mobile device-stored applications and the second plurality of mobile applications is displayed as cloud-stored applications.

10. The authentication system of claim 9 wherein a download command is executed prior to operating a mobile application included in the first plurality of mobile applications.

* * * * *